Patented Nov. 28, 1939

2,181,122

UNITED STATES PATENT OFFICE 2,181,122

STABILIZATION OF ORGANIC SUBSTANCES

Frederick B. Downing, Carneys Point, and Charles J. Pedersen, Penns Grove, N. J., assignors to E. I. du Pont de Nemours & Company, Wilmington, Del., a corporation of Delaware No Drawing. Original application December 29, 1937, Serial No. 182,375. Divided and this application January 20, 1938, Serial No. 185,929

16 Claims. (Cl. 23—250)

This invention relates to the stabilization of organic substances, and particularly to the protection of organic substances against the deleterious action of oxygen catalyzed by the presence of copper and its compounds, and more particularly to the preservation of oxidizable mineral hydrocarbons containing or in contact with copper and its compounds.

Many organic substances, such as animal and vegetable fats and oils, edible oils, vegetable juices, textile fibers, petroleum products, photographic developers and synthetic unsaturated compounds, deteriorate upon exposure to the atmosphere over periods of time, which deterioration is due to oxygen. Such attack by oxygen produces oxidation products, disaggregation or polymerization, or a combination of two or three thereof. The disaggregation and polymerization is generally induced by the primary oxidation products which apparently act as catalysts to accelerate the deterioration. This phenomenon, generally termed auto-oxidation, usually proceeds very slowly at first, but gradually accelerates until a maximum is reached. The initial period of negligible reaction rate is called the induction period. Such deterioration imparts undesirable qualities to the organic substances and eventually destroys their usefulness.

Signal success has been achieved in recent years in the preservation of many organic substances by the discovery and use of compounds generally called "oxidation inhibitors", "antioxidants", "preservatives", "anti-agers" and "gum inhibitors". Such agents, which are mostly oxidizable organic compounds, are oxidized in the course of time, and hence the beneficial effect obtained by their use is not permanent. They protect the organic substances only so long as they are not rendered inactive. They are, moreover, very specific in their action, each type of auto-oxidizable substance requiring a different type of "antioxidant" for the best results.

It is well known that copper and its compounds promote the formation of gum in gasoline, speed the aging of rubber and the development of rancidity in fats and oils. In other words, copper and its compounds accelerate the rate of oxidation of oxidizable organic substances, including most of the antioxidants. Accordingly, copper and antioxidants are antagonistic in action and the normal effect of the antioxidant is greatly reduced in the presence of copper and its compounds.

Copper as such, or in the form of its compounds, occurs naturally in many organic products, frequently in such slight traces as to cause very little harm. However, the concentration of copper and its compounds is frequently increased during the course of handling and utilizing the substances. Vessels and conduits made of metals containing copper are used for storage and transportation. Ingredients contaminated with copper or its compounds are sometimes added to the organic substances. In some cases, copper, as such or in the form of its compounds, is actually required in at least one of the steps in the preparation of the organic substances, as in the sweetening of gasoline with cupric chloride. Therefore, although copper and its compounds are not necessarily present in organic substances which are not derivatives of copper, they are frequently present, at least accidentally, in many organic substances. The activity of copper and its compounds to catalyze oxidation of oxidizable organic substances is inherent and is possessed by the copper in the various media unless the activity has been modified or suppressed by chemical means.

There are three possible methods of preventing the harmful effect of copper and its compounds. The copper and its compounds may be removed by purification, but this is frequently impossible and usually too costly to be practicable. In certain cases, it is possible to add sufficient amount of an antioxidant to the organic substance containing the copper or its compound so that the preserving effect of the antioxidant is equal to or greater than the effect of the copper present. However, the efficiency of the antioxidant, under such conditions, is so greatly diminished that very large amounts of antioxidant are necessary and the advantage gained is seldom worth the cost of the increased quantity of antioxidant required. The third method comprises suppression of the catalytic activity of the copper by chemical means without removing the copper from the organic substance. The present invention is directed to this third expedient. Compounds capable of effectively suppressing the catalytic activity of copper and its compounds are hereinafter named generically as "copper deactivators".

While the so-called "antioxidants" are specific to the type of organic substance, it has been found that copper deactivators are specific for copper and its compounds and are independent of the organic substance. In so far as the organic substance to be stabilized is concerned, the only requirements are that the copper deactivator is soluble therein and that the organic substance is not strongly acid so as to destroy the copper deactivator compound.

An object of the present invention is to retard the deterioration of organic substances caused by the action of molecular oxygen and promoted by the presence of copper and its compounds. Another object is to provide a class of organic compounds which, when added to an organic substance normally subject to deterioration by oxygen in the presence of copper and its compounds, will suppress the activity of the copper or its compounds. A further object is to provide a method for rendering antioxidants more effective for the preservation of organic substances in the presence of copper and its compounds. A still further object is to provide a class of organic compounds which, when added to an organic substance in the presence of an antioxidant and in the presence of copper or its compounds, increases the efficiency of the antioxidant. Still further objects are to inhibit the formation of color, acids, gum, sludge and the like in mineral hydrocarbons containing or in contact with copper or its compounds. Other objects are to provide new compositions of matter and to advance the art. Still other objects will appear hereinafter.

The above and other objects may be accomplished in accordance with our invention which comprises incorporating, in organic substances which are subject to deterioration normally caused by oxygen in the presence of copper and its compounds, organic compounds of the type of arylidene amines or Schiff's bases, obtained by condensing one mol of a polyamine, containing at least two primary amino groups capable of reacting with aromatic aldehydes to form arylidene amines, with at least two mols of an ortho-hydroxy substituted aldehyde which is aromatic in nature, so that not more than one mol of aldehyde reacts for each primary amino group of the amine.

The polyamine may be any aliphatic amine containing at least two primary amino groups directly attached to different carbon atoms of the same open chain and which amine may contain aromatic or other cyclic groups substituted on the chain. The term "aliphatic polyamine", as employed hereinafter and in the claims, will be understood to have the foregoing meaning. The polyamine may be an aromatic or other cyclic amine, having at least two primary amino groups attached to different substantially adjacent atoms of the ring or rings, either directly or through one or more atoms which are not members of the rings. The preferred polyamines are those consisting of carbon, hydrogen and nitrogen, those in which at least two primary amino groups are directly attached to adjacent carbon atoms, and particularly the diamines.

By "substantially adjacent atoms", we mean only ring atoms directly bonded together and ring atoms located in different nuclei of polynuclear compounds which ring atoms are the two atoms, not common to two rings nor forming part of the linkage between two rings, nearest to each other. By "adjacent atoms", we mean atoms directly bonded together. By "polynuclear compounds", we mean to include compounds containing two or more rings having no ring carbon atoms in common as well as fused ring compounds.

By an "ortho-hydroxy substituted aldehyde", we mean one in which the hydroxy group and the aldehyde, or —CHO, group are directly bonded to adjacent ring carbon atoms. By the term "aldehyde, aromatic in nature", we intend to include the unsaturated cyclic aldehydes, such as the pyridine and quinoline aldehydes, which have many of the characteristic properties of the aromatic aldehydes, as well as the strictly aromatic aldehydes in which the hydroxy and aldehyde groups are bonded to nuclear carbon atoms of an aromatic ring.

The aldehyde is preferably an aromatic aldehyde and also preferably one devoid of substituents other than hydrocarbon and hydroxy groups. However, such aldehyde may contain, as substituents, alkoxy, aryloxy, halogen, heterocyclic, amino, cyano, carboxyl and sulfonic groups, as well as hydroxy, alkyl and aryl radicals. The polyamine may be likewise substituted but is preferably unsubstituted.

Accordingly, the copper deactivating compounds of our invention may be represented by the formula

HO—A—CH=N—R—N=CH—A—OH wherein A represents an aromatic ring or an unsaturated heterocyclic ring of 5 to 6 atoms in which the hetero atom is nitrogen, the OH radical being attached directly to a ring carbon atom ortho to the —CH=N— group, and R represents an aliphatic radical having the two N atoms attached directly to different carbon atoms of the same open chain. R in the formula may also represent an aromatic group, a cycloaliphatic group containing 6 carbon atoms in the ring or a heterocyclic group containing a heterocyclic ring of six atoms in which the hetero atom is nitrogen, the two N atoms being separately attached directly to adjacent ring carbon atoms or to the most closely positioned ring carbon atoms of different rings, other than carbon atoms forming part of the linkage between the two rings.

The quantity of copper deactivator added will be dependent upon the amount of copper present in the organic substance. At least one mol of copper deactivator must be added for each atom of copper in the organic substance. Preferably from about 1.5 to 100 mols of copper deactivator is used for each atom of copper in the organic substance. From about 0.0002 to about 0.01% of copper deactivator based on the organic substance will generally be satisfactory in most organic substances where the copper or copper compound is accidentally present. Higher ratios of copper deactivator may be used, particularly when the organic substance is in contact with metallic copper in bulk which forms a reservoir of copper ions.

In order to avoid confusion arising from a superabundance of data, cracked gasoline has been selected as an example of an auto-oxidizable organic substance for illustrating the present invention. The samples employed were commercial blends of cracked and straight-run gasolines, completely refined but otherwise untreated with chemical agents such as dyes, anti-knock agents and antioxidants. b-Benzylaminophenol, sometimes hereinafter referred to as BAP, has been chosen as the representative gasoline antioxidant.

As representative of a copper deactivator of our invention, we have chosen di-(2-hydroxybenzal)-ethylenediamine, sometimes referred to hereinafter by the abbreviation SED. A representative copper catalyst is copper oleate. The concentrations of these materials as given in the following tables are given in weight percent in the gasoline, those for the copper catalyst being based on the content of copper rather than copper oleate.

The aging of gasoline results in the formation of gum. When the gum content exceeds 10 mg. per 100 cc. as determined by the A. S. T. M. air jet method, the gasoline is considered unfit for use. When reference is made hereinafter to air jet gum, it will be understood that we refer to gum formed in gasoline as determined by such method.

The method employed for determining the induction periods given in the tables, was developed by Voorhees and Eisinger and is described in S. A. E. J. 24 584 (1929). It has been found that the induction period, obtained by this method, is a fairly accurate measure of the relative stability of gasoline under normal storage conditions.

In order to show the effect of copper on the induction period of cracked gasoline, both in the presence and in the absence of antioxidants, the following Table I is given. This table shows the effect of copper in two different samples of gasoline and in the presence of five well known gasoline antioxidants. The copper was present as copper oleate.

The induction periods given in parentheses were estimated by extrapolation, assuming that the concentration effect of antioxidants in cracked gasoline can be represented by a straight line. It has been found that, within reasonable limits, the concentration effect is linear.

It will be noted that in order to counteract the effect of one part per million (0.0001%) of copper, 3.5 times the quantity of alpha naphthol, 3.1 times the quantity of catechol and 4 times the quantity of hardwood-tar distillate had to be used. To overcome the effect of 10 parts per million of copper, 7 times the quantity of benzylaminophenol and 7.5 times the quantity of p-(n-butyl)-aminophenol were required. The cost of such large amounts of antioxidant are prohibitive in the present day manufacture of gasoline. Also, considerable difficulty is encountered in rapidly dissolving such amounts of antioxidant in the gasoline in commercial practice. Such large amounts of antioxidant are also objectionable due to the odor imparted to the gasoline and the relatively large amounts of non-volatile matter added.

That the harmful effect of copper is not restricted to soluble copper compounds, but that such harmful properties are possessed by insoluble solid copper compounds and metallic copper itself, is shown by the following Table II, representing tests on 100 c. c. portions of two different samples of gasoline:

TABLE I

*The effect of antioxidants on the induction period of cracked gasoline in presence and absence of dissolved copper*

| No. | Antioxidant | Conc., weight percent | Dissolved Cu, weight percent | Induction period, minutes |
|---|---|---|---|---|
| 1 | None | | None | 110 |
| 2 | do | | 0.0001 | 30 |
| 3 | a-Naphthol | 0.005 | None | 270 |
| 4 | do | 0.005 | 0.0001 | 40 |
| 5 | do | 0.0175 | None | (680) |
| 6 | do | 0.0175 | 0.0001 | 270 |
| 7 | Catechol | 0.008 | None | 270 |
| 8 | do | 0.008 | 0.0001 | 80 |
| 9 | do | 0.025 | None | (610) |
| 10 | do | 0.025 | 0.0001 | 270 |
| 11 | Hardwood-tar distillate | 0.025 | None | 260 |
| 12 | do | 0.025 | 0.0001 | 60 |
| 13 | do | 0.10 | None | (710) |
| 14 | do | 0.10 | 0.0001 | 230 |
| 15 | None | | None | 90 |
| 16 | do | | 0.001 | About 5 |
| 17 | p-Benzylaminophenol | 0.002 | None | 360 |
| 18 | do | 0.002 | 0.001 | About 10 |
| 19 | do | 0.014 | None | (1970) |
| 20 | do | 0.014 | 0.001 | 360 |
| 21 | p-(n-Butyl)aminophenol | 0.0015 | None | 370 |
| 22 | do | 0.0015 | 0.001 | About 10 |
| 23 | do | 0.0113 | None | (2140) |
| 24 | do | 0.0113 | 0.001 | 370 |

TABLE II

*The effect of copper and its derivatives on the induction period of cracked gasoline stabilized with BAP*

| No. | Conc. BAP, weight, percent | Catalyst | Concentration of catalyst | Induction period, minutes |
|---|---|---|---|---|
| 1 | None | None | | 100 |
| 2 | 0.002 | do | | 510 |
| 3 | 0.002 | Metallic copper | 0.5 sq. in. of surface | 140 |
| 4 | 0.002 | Cupric sulfide | 0.25 gm. of powder | 220 |
| 5 | None | None | | 180 |
| 6 | 0.001 | do | | 380 |
| 7 | 0.001 | Cupric oleate | 0.001% by weight | 20 |
| 8 | 0.001 | Cupric chloride | 0.0002% by weight | About 10 |

The difference in degrees of activity of these copper compounds may be explained at least in part by the differences in solubility and effective contact surface of the different compounds.

The effect of the copper varies with its concentration. This is shown in the following table:

TABLE III

*The effect of copper concentration on the induction period of stabilized and unstabilized cracked gasoline*

| No. | Conc. Cu, weight percent / Conc. antioxidant, weight percent | Induction period in minutes | | | | |
|---|---|---|---|---|---|---|
| | | None | 0.000025% | 0.00005% | 0.000075% | 0.0001% |
| 1 | None | 110 | 60 | 50 | 40 | 30 |
| 2 | 0.002 BAP | 420 | 150 | 120 | 100 | 80 |
| 3 | 0.005 catechol | 300 | 150 | 110 | 100 | 90 |

It will be seen that the effect is a function of the concentration of the copper, and that the percentage effect is greater on samples containing antioxidants than on the untreated gasoline. It was found that the action of copper was just detectable at 0.00001%.

In order to illustrate how the copper deactivators of our invention suppress the catalytic activity of copper and increase the efficiency of antioxidants in the presence of copper, a number of deactivators were tested in gasoline containing 0.001% of p-benzylaminophenol and 0.0001% of copper as copper oleate. This gasoline, in the absence of antioxidant, copper or deactivator, had an induction period of 170 minutes. The addition of 0.001% of benzylaminophenol, in the absence of copper or deactivator, increased the induction period to 380 minutes. The results of the tests are shown in Table IV.

TABLE IV

*The effect of copper deactivators on the induction period of cracked gasoline stabilized with 0.001% BAP and containing 0.0001% Cu*

| No. | Deactivator | Conc. deact., weight percent | Induction period, minutes |
|---|---|---|---|
| 1 | None | | 30 |
| 2 | Di-(2-hydroxybenzal)-ethylenediamine (SED) | 0.001 | 420 |
| 3 | Di-(2-hydroxybenzal)-hexylenediamine | 0.001 | 200 |
| 4 | Di-(2-hydroxybenzal)-diethylenetriamine | 0.002 | 280 |
| 5 | Di-(2-hydroxybenzal)-triethylenetetramine | 0.002 | 280 |
| 6 | Di-(2-hydroxybenzal)-1,2-diaminobenzene | 0.001 | 420 |
| 7 | Di-(2-hydroxy-3-methoxybenzal)-propylenediamine | 0.002 | 380 |
| 8 | Di-(2-hydroxy-3-nitrobenzal)-ethylenediamine | 0.00186 | 320 |

In the following Tables V and VI, the effect of di-(2-hydroxybenzal)-ethylenediamine on two different gasolines, in the absence of copper or antioxidants, in the presence of copper, in the presence of p-benzylaminophenol (an antioxidant) and in the presence of both copper and p-benzylaminophenol, is shown:

TABLE V

*The effect of SED on the induction period of cracked gasoline in the presence and the absence of metallic copper*

| No. | Conc. BAP, weight percent | Metallic copper, sq. in./100 c. c. gasoline | Conc. SED, weight percent | Induction period, minutes |
|---|---|---|---|---|
| 1 | None | None | None | 80 |
| 2 | None | None | 0.005 | 80 |
| 3 | None | None | 0.01 | 80 |
| 4 | None | 0.5 | None | 50 |
| 5 | None | 0.5 | 0.005 | 80 |
| 6 | None | 0.5 | 0.01 | 80 |
| 7 | 0.001 | None | None | 230 |
| 8 | 0.0015 | None | None | 330 |
| 9 | 0.002 | None | None | 470 |

TABLE VI

*The effect of SED on the induction period of stabilized cracked gasoline containing dissolved copper*

| No. | Conc. BAP, weight percent | Conc. Cu, weight percent | Conc. SED, weight percent | Induction period, minutes |
|---|---|---|---|---|
| 1 | None | None | None | 100 |
| 2 | 0.001 | None | None | 180 |
| 3 | 0.002 | None | None | 280 |
| 4 | 0.003 | None | None | 380 |
| 5 | None | None | 0.0005 | 100 |
| 6 | 0.001 | None | 0.0005 | 210 |
| 7 | 0.002 | None | 0.0005 | 340 |
| 8 | 0.003 | None | 0.0005 | 440 |
| 9 | 0.001 | None | 0.0002 | 210 |
| 10 | 0.001 | None | 0.001 | 210 |
| 11 | 0.001 | None | 0.005 | 210 |
| 12 | 0.002 | None | 0.0002 | 340 |
| 13 | 0.002 | None | 0.001 | 330 |
| 14 | 0.002 | None | 0.005 | 340 |
| 15 | 0.006 | None | None | (660) |
| 16 | 0.011 | None | None | (1130) |
| 17 | 0.016 | None | None | (1600) |
| 18 | 0.002 | 0.0001 | None | 5 |
| 19 | 0.006 | 0.0001 | None | 20 |
| 20 | 0.011 | 0.0001 | None | 60 |
| 21 | 0.016 | 0.0001 | None | 120 |
| 22 | 0.002 | 0.0001 | 0.0002 | 20 |
| 23 | 0.002 | 0.0001 | 0.0005 | 260 |
| 24 | 0.002 | 0.0001 | 0.001 | 290 |
| 25 | 0.002 | 0.0001 | 0.005 | 310 |

The induction periods in parentheses were estimated by extrapolation, assuming that the concentration effect of benzylaminophenol is rectilinear.

These tests show that the di-(2-hydroxybenzol)-ethylenediamine is not an antioxidant, but suppresses only the catalytic action of the copper. It does not, by itself, increase the induction period of gasoline in the absence of copper. In the presence of copper, it suppresses the action of the copper, but does not increase the induction period beyond that of the gasoline containing no copper. The addition of this copper deactivator to gasoline containing benzylaminophenol had but slight effect on the induction period in the absence of copper. The slight effect shown was apparently due to the presence of a very slight amount of copper in the original gasoline, which was found by spectroscopic analysis. This slight amount of copper, originally present in the gasoline, was completely suppressed by 0.0002% of the copper deactivator. In the gasoline containing 0.0001% of copper and benzylaminophenol, it required 0.0005% or about 1.22 mols of copper deactivator for each atom of copper to nearly completely deactivate the copper. The addition of further amounts of the copper deactivator gave but little improvement. It will also be noted from this table that the use of additional amounts of benzylaminophenol in the presence of added copper was not equivalent to the addition of the copper deactivator. For example, 0.0005% of copper inhibitor increased the induction period of gasoline containing 0.002% of benzylaminophenol and 0.0001% of copper to a greater extent than 0.014% of additional benzylaminophenol. Hence, under these circumstances, one part of copper deactivator was more effective than 28 parts of benzylaminophenol.

The effects of a copper deactivator with different antioxidants and combinations of different antioxidants, in the presence of copper and in comparison with the effect of different antioxidants and combinations of antioxidants in the presence and absence of copper, are shown in Table VII.

TABLE VII

*The effect of two antioxidants together on the induction period of cracked gasoline containing dissolved copper*

| No. | Conc. antioxidant, weight percent | Conc. Cu., weight percent | Conc. SED, weight percent | Induction period, minutes |
|---|---|---|---|---|
| 1 | None | None | None | 170 |
| 2 | 0.001 BAP | None | None | 360 |
| 3 | 0.002 a-naphthol | None | None | 320 |
| 4 | 0.004 catechol | None | None | 350 |
| 5 | None | None | 0.0005 | 170 |
| 6 | None | 0.0001 | None | 20 |
| 7 | 0.001 BAP | 0.0001 | None | 20 |
| 8 | 0.002 a-naphthol | 0.0001 | None | 40 |
| 9 | 0.004 catechol | 0.0001 | None | 100 |
| 10 | None | 0.0001 | 0.0005 | 150 |
| 11 | 0.001 BAP<br>0.002 a-naphthol | None | None | (510) |
| 12 | 0.001 BAP<br>0.004 catechol | None | None | (540) |
| 13 | 0.001 BAP<br>0.002 a-naphthol | 0.0001 | None | 50 |
| 14 | 0.001 BAP<br>0.004 catechol | 0.0001 | None | 180 |
| 15 | 0.001 BAP | 0.0001 | 0.0005 | 380 |

The induction periods shown in parentheses were calculated by assuming that the effects of different antioxidants are additive when used in combination. It has been found that, within reasonable limits, this assumption is usually proper.

It will be noted that alpha naphthol and catechol are antioxidants and are susceptible to the harmful effects of copper, although catechol is more resistant to it than alpha naphthol or benzyl aminophenol. The increase in induction period of gasoline stabilized with 0.001% of benzylaminophenol and containing 0.0001% of copper obtained by the addition of alpha naphthol and catechol was slight. The effects obtained may be considered to be nearly additive as in the absence of copper. However, the addition of the copper deactivator, SED, increased the induction period so that it was equal to the induction period obtained with 0.001% of benzylaminophenol in the absence of copper. Accordingly, one part of copper deactivator was more effective to counteract the effect of copper than four parts of alpha naphthol or eight parts of catechol. It will also be noted that the effects of benzylaminophenol and the copper deactivator, when used together, are definitely synergistic and not additive.

The efficiencies of antioxidants other than benzylaminophenol are also improved in the presence of copper by the addition of a copper deactivator of our invention. Although the effect of the copper deactivator on the efficiency of benzylaminophenol only has been disclosed, similar results were obtained with other antioxidants such as other p-aminophenol derivatives, alpha naphthol, catechol, pyrogallol, mesitol, the xylenols, p-hydroxyphenyl morpholine and hardwood-tar distillate. There is no reason to believe that any true antioxidant would fail to respond to this treatment.

It sometimes happens that a relatively stable gasoline has been rendered unstable by contamination with considerable traces of copper. If such a gasoline were freed of the effect of the copper, its induction period would be sufficiently long for practical purposes without necessitating the use of an antioxidant. In such cases, the use of a copper deactivator alone will produce a motor fuel of satisfactory aging property. This is shown in Table VIII.

TABLE VIII

*Cracked gasoline requiring only a copper deactivator for sufficient stabilization*

| No. | Conc. BAP, weight percent | Conc. SED, weight percent | Induction period, minutes | Increase in induction period, minutes |
|---|---|---|---|---|
| 1 | None | None | 270 | ---------- |
| 2 | 0.001 | None | 350 | 80 |
| 3 | 0.002 | None | 430 | 160 |
| 4 | None | 0.000125 | 340 | 70 |
| 5 | None | 0.001 | 430 | 160 |

It will be noted that 0.001% of the copper deactivator increased the induction period to the same extent as 0.002% of benzylaminophenol. Hence, an antioxidant was not necessary to obtain this degree of stabilization. Even here, the action of the antioxidant and that of the copper deactivator were different. The concentration effect of the antioxidant was directly proportional, there being an 80-minute increase in induction period for each increase of 0.001% of antioxidant. The concentration effect of the copper deactivator was 560 minutes for each 0.001% at a concentration of 0.000125%, and 160 minutes for each 0.001% increase at 0.001% concentration. Thus, a quantity of copper deactivator lying between 0.000125% and 0.001% was all that was required to deactivate the copper present.

The rate of gum formation in a cracked gasoline, containing 0.0001% of dissolved copper, under conditions of normal storage in glass bottles protected from direct sunlight, in the presence and in the absence of benzylaminophenol and benzylaminophenol in combination with di-(2-hydroxybenzal)-ethylenediamine, is shown in Table IX, in which the figures represent mg./100 c.c. of air jet gum after aging for the number of days shown.

TABLE IX

*Aging of cracked gasoline containing 0.0001% dissolved Cu under normal storage conditions*

| Days of aging at atmospheric temp. | Control (no BAP or SED) | 0.0025% BAP | 0.0025% BAP+ 0.001% SED |
|---|---|---|---|
| 0 | 1.0 | 1.5 | 1.5 |
| 6 | 10.5 | 13.5 | 2.5 |
| 14 | 15.5 | 14.0 | 2.5 |
| 26 | 69 | 56 | 1.5 |
| 80 | 225 | 208 | 1.2 |
| 133 | 305 | 313 | 3.4 |
| 182 | 427 | 406 | 4.4 |

It will be noted that the control, which contained 0.0001% of copper, but no antioxidant or copper deactivator, was unfit for use within six days. This rapid aging was not retarded by the addition of 0.0025% of benzylaminophenol. The supplementary addition of 0.001% of copper deactivator, however, stabilized the gasoline to such an extent that it was still satisfactory at the end of 182 days.

There is another well known accelerating aging test for gasoline generally called the Ethyl Gasoline Corporation oxygen bomb method described in S. A. E. J. 26 31 (1930); J. I. E. C. 25 1234 (1933) and Yonkers Laboratory Company, Bulletin No. 40–O. R.–1931. The results obtained by this method are shown in Table X.

TABLE X

*The effect of SED on the induction period of cracked gasoline stabilized with BAP and containing dissolved Cu (oxygen bomb method)*

| No. | BAP | Conc. Cu, weight percent | Conc. SED, weight percent | Induction period, minutes |
|---|---|---|---|---|
| 1 | Present | None | None | 195 |
| 2 | ___do___ | 0.0001 | None | 60 |
| 3 | ___do___ | 0.0001 | 0.005 | 180 |

It will be noted that the copper deactivator suppressed the catalytic activity of the copper under the conditions of this test also.

We believe that the above tests conclusively show that the function of the copper deactivators is merely to suppress the action of the copper, and that their effect is distinctly different from that of the antioxidants, the effect being a difference in kind rather than a difference in degree.

The copper deactivators of the class of the present invention are well known compounds and the methods of preparing the same are described in the literature. They are readily prepared by reacting the required molal proportions of aldehyde and polyamine with or without the use of a suitable solvent such as water, methanol or ethanol. The reactions are exothermic and water is formed. Nearly theoretical yields of the compounds are obtained. The chemical equation for the formation of di-(2-hydroxybenzal)-ethylenediamine (SED) may be represented as follows:

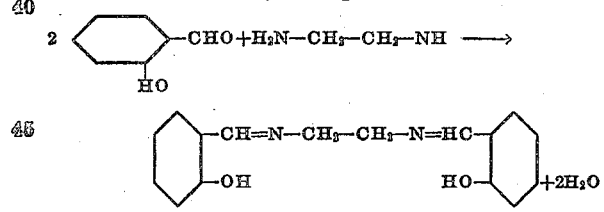

The solubility of our compounds in the organic substances is dependent upon their constitution. For example, with a given polyamine, a ring-alkylated 2-hydroxybenzaldehyde yields a more soluble product than 2-hydroxybenzalaldehyde. With a given aldehyde, hexamethylenediamine forms a more soluble deactivator than ethylene diamine. Our compounds are only slightly soluble in water except when they are solubilized with certain groups such as the sulfonic acid and carboxyl groups, or when the hydrogen atoms of the hydroxyl groups are replaced by suitable cations such as sodium or potassium ions.

Unlike antioxidants, our compounds are resistant to the action of molecular oxygen and solutions of our compounds may be kept in the presence of air for years without any apparent change. They are thermally stable at temperatures appreciably above their melting points, but are destroyed by strong mineral acids or hot dilute mineral acids. They are generally colored yellow of varying shade and intensity, and form copper compounds which are greenish in color and not bluish or purplish.

Our copper deactivators may be added to the organic substances to be treated in any desirable form and manner. They may be in solid or liquid form, mixed with other addition agents or dissolved in a solvent. The aldehydes and the polyamines may be separately added to the organic substance, so that the deactivators are formed in the organic substance. If the organic substance already contains one of the parent compounds, the other raw material may be incorporated and the deactivator formed in situ. Our copper deactivators may be added to the finished organic substances or to such substances at any stage in the processes of manufacture or handling.

While we have disclosed tests illustrating the effect of our copper deactivators in cracked gasoline, these copper deactivators have been tested and found to be effective for suppressing the deleterious effect of copper and its salts in motor benzol, fuel oils, heating oils, animal fats and oils, vegetable fats and oils, edible oils, drying oils, soaps, photographic developers, gasoline antioxidants, vegetable juices and rubber. It is merely necessary to employ a copper deactivator which is soluble in the organic substance to be protected, avoiding conditions such as the presence of substantial amounts of strong mineral acids which would destroy the copper deactivator. Accordingly, our copper deactivators will be found to be effective in petroleum products and mineral hydrocarbons such as gasoline, kerosene, fuel oil, transformer oil, lubricating oil and the like; fats; waxes; animal and vegetable fats and oils, and derivatives obtained therefrom such as soaps; sulfonated and sulfated oils, including alcohol sulfates; fruit and vegetable juices; essential oils; perfumes; cotton; silk; paper; wool; cellulose acetate; regenerated cellulose products; synthetic products, such as photographic developers, antioxidants, and conjugated dienes and their polymerization products, particularly chloroprene, "Neoprene" and "Neoprene" latex. The deactivators also function in solutions of such organic substances in different solvents, as well as in mixtures of such substances.

Besides many others, the compounds, obtained by condensing each of the following aldehydes with each of the following polyamines, are copper deactivators:

| Aldehydes | Polyamines |
|---|---|
| 2-hydroxybenzaldehyde | Methylenediamine. |
| 2-hydroxy-5-chlorobenzaldehyde | Ethylenediamine. |
| 2-hydroxy-3:5-dibromobenzaldehyde. | 1:2-propylenediamine. |
| 2-hydroxy-3-nitrobenzaldehyde | 1:3-propylenediamine. |
| 2-hydroxy-6-methyl benzaldehyde. | 1:10-decylenediamine. |
| 2-hydroxy-3-methyoxybenzaldehyde. | Diethylenetriamine. |
| 2:4-dihydroxybenzaldehyde | Triethylenetetramine. |
| 2:6-dihydroxybenzaldehyde | Pentaerythrityltetramine. |
| 2-hydroxy-3-cyanobenzaldehyde | 1:2-diamino-cyclohexane. |
| 2-hydroxy-3-carboxybenzaldehyde. | 1:2-diaminobenzene. |
| 2-hydroxybenzaldehyde-3-sulfonic acid. | 2:3-diaminopyridine. |
| 2-hydroxynaphthaldehyde-1 | 2:3-diaminonaphthridine-1:4. |
| 1-hydroxynaphthaldehyde-2 | 4:5-diaminoquinoline. |
| Anthrol-2-aldehyde-1 | 1:8-diaminonaphthalene. |
| 2-hydroxyfluorene-aldehyde-1 | 1:2-diaminoanthraquinone. |
| 4-hydroxydiphenyl-aldehyde-3 | 3:4-diaminodiphenyl. |
| 3-hydroxyphenanthrene-aldehyde-4. | 9:10-diaminophenanthrene. |
| 1:3-dihydroxy-2:4-dialdehydo-benzene. | 3:4-toluylene diamine. |
| 4-hydroxypyridine-aldehyde-3 | 2:2'-diamino diphenyl. |
| 4-hydroxyquinoline-aldehyde-3 | 4:5-diamino phenanthrene. |
| 7-hydroxyquinoline-aldehyde-8 | 2:2'-diamino-diphenyl-methane. |
| 2-hydroxy-furfuryl aldehyde | 2:2'-diamino-triphenyl-methane. |
| | 2:2':2''-triamino-triphenyl-methane. |
| | 2:2'-diamino-diphenylamine. |

Although the last four aldehydes of the above list are not strictly aromatic, they have many of the characteristic properties of the aromatic aldehydes, and hence are aromatic in nature and will produce effective copper deactivators. Mixtures of two or more copper deactivators may be employed and particularly mixtures obtained by the condensation of a polyamine with a mixture of aldehydes, or of a given aldehyde with a mixture of polyamines.

It is to be noted that not all condensation products of all aldehydes with organic polyamines are necessarily copper deactivators. Compounds, produced from aldehydes which do not contain a hydroxyl group attached to a carbon atom of the ring adjacent to the carbon to which the aldehyde group is attached, have been found to have very little or no effect as copper deactivators.

From all of the above, it will be apparent that, by our invention, we have made it possible to stabilize many organic substances, susceptible to the harmful action of oxygen catalyzed by copper and its compounds, by the addition of one or more members of a class of compounds which suppress the harmful activity of the copper and its compounds. We have shown that the deactivator is effective alone or in combination with an amount of an antioxidant which is generally required to stabilize the products in the absence of copper. Thus, we have made it possible to effectively and economically stabilize organic substances by means of antioxidants even in the presence of copper and its compounds without it being necessary to employ large amounts of antioxidant to overcome the catalytic action of the copper.

While we have disclosed the preferred embodiments of our invention and the preferred modes of carrying the same into effect it will be readily apparent to those skilled in the art that many variations and modifications may be made therein without departing from the spirit of our invention. Accordingly the scope of our invention is to be limited solely by the appended claims construed as broadly as is permissible in view of the prior art.

This is a division of our copending application, Serial No. 182,375 filed December 29, 1937.

We claim:

1. The method of inhibiting the catalytic oxidation of an organic substance caused by a member of the group consisting of copper and its compounds which comprises incorporating in said organic substance a small amount of a copper deactivator having the formula

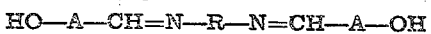

wherein A represents a member of the group consisting of aromatic rings and unsaturated heterocyclic rings of 5 to 6 atoms in which the hetero atom is nitrogen, the OH radical being attached directly to a ring carbon atom ortho to the —CH=N— group, and R represents a group of the class consisting of aromatic groups, cycloaliphatic groups containing 6 carbon atoms in the ring, and heterocyclic groups containing heterocyclic rings of 6 atoms the hetero atom being nitrogen, and in which the two N atoms are attached directly to adjacent ring carbon atoms or to the most closely positioned ring carbon atoms of different rings other than carbon atoms forming part of the linkage between the two rings of the R group.

2. The method of inhibiting the catalytic oxidation of an organic substance caused by a member of the group consisting of copper and its compounds which comprises incorporating in said organic substance a small amount of a copper deactivator having the formula

wherein A represents an aromatic group of the benzene series, the OH radical being attached directly to a ring carbon atom ortho to the —CH=N— group, and R represents an aromatic group, and in which the two N atoms are attached directly to adjacent ring carbon atoms or to the most closely positioned ring carbon atoms of different rings other than carbon atoms forming part of the linkage between the two rings of the R group.

3. The method of inhibiting the catalytic oxidation of an organic substance caused by a member of the group consisting of copper and its compounds which comprises incorporating in said organic substance a small amount of a copper deactivator having the formula

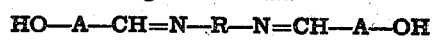

wherein A represents an aromatic group of the benzene series, the OH radical being attached directly to a ring carbon atom ortho to the —CH=N— group, and R represents an aromatic hydrocarbon group, and in which the two N atoms are attached directly to adjacent ring carbon atoms of the R group.

4. The method of inhibiting the catalytic oxidation of an organic substance caused by a member of the group consisting of copper and its compounds which comprises incorporating in said organic substance a small amount of a copper deactivator having the formula

wherein A represents a mononuclear aromatic hydrocarbon group of the benzene series, the OH radical being attached directly to a ring carbon atom ortho to the —CH=N— group, and R represents a mononuclear aromatic hydrocarbon group of the benzene series, and in which the two N atoms are attached directly to adjacent ring carbon atoms of the R group.

5. The method of inhibiting the catalytic oxidation of an organic substance caused by a member of the group consisting of copper and its compounds which comprises incorporating in said organic substance a small amount of di-(2-hydroxylbenzal)-1,2-diaminobenzene.

6. The method of inhibiting the catalytic oxidation of an organic substance caused by a member of the group consisting of copper and its compounds and inhibiting the deleterious effect of copper and its compounds on an antioxidant in said organic substance, which antioxidant is normally effective to materially retard deterioration of said organic substance in the absence of copper and its compounds but which is less effective in the presence of copper and its compounds, which comprises incorporating in said organic substance a small amount of a copper deactivator having the formula

wherein A represents a member of the group consisting of aromatic rings and unsaturated heterocyclic rings of 5 to 6 atoms in which the hetero atom is nitrogen, the OH radical being attached directly to a ring carbon atom ortho to the —CH=N— group, and R represents a group of the class consisting of aromatic groups, cycloaliphatic groups containing 6 carbon atoms in the ring, and heterocyclic groups containing heterocyclic rings of 6 atoms the hetero atom being nitrogen, and in which the two N atoms are attached directly to adjacent ring carbon atoms or to the most closely positioned ring carbon atoms of different rings other than carbon atoms forming part of the linkage between the two rings of the R group.

7. The method of inhibiting the catalytic oxidation of an organic substance caused by a member of the group consisting of copper and its compounds and inhibiting the deleterious effect of copper and its compounds on an antioxidant in said organic substance, which antioxidant is normally effective to materially retard deterioration of said organic substance in the absence of copper and its compounds but which is less effective in the presence of copper and its compounds, which comprises incorporating in said organic substance a small amount of a copper deactivator having the formula

HO—A—CH=N—R—N=CH—A—OH wherein A represents an aromatic group of the benzene series, the OH radical being attached directly to a ring carbon atom ortho to the —CH=N— group, and R represents an aromatic group, and in which the two N atoms are attached directly to adjacent ring carbon atoms or to the most closely positioned ring carbon atoms of different rings other than carbon atoms forming part of the linkage between the two rings of the R group.

8. The method of inhibiting the catalytic oxidation of an organic substance caused by a member of the group consisting of copper and its compounds and inhibiting the deleterious effect of copper and its compounds on an antioxidant in said organic substance, which antioxidant is normally effective to materially retard deterioration of said organic substance in the absence of copper and its compounds but which is less effective in the presence of copper and its compounds, which comprises incorporating in said organic substance a small amount of a copper deactivator having the formula

HO—A—CH=N—R—N=CH—A—OH wherein A represents an aromatic group of the benzene series, the OH radical being attached directly to a ring carbon atom ortho to the —CH=N— group, and R represents an aromatic hydrocarbon group, and in which the two N atoms are attached directly to adjacent ring carbon atoms of the R group.

9. The method of inhibiting the catalytic oxidation of an organic substance caused by a member of the group consisting of copper and its compounds and inhibiting the deleterious effect of copper and its compounds on an antioxidant in said organic substance, which antioxidant is normally effective to materially retard deterioration of said organic substance in the absence of copper and its compounds but which is less effective in the presence of copper and its compounds, which comprises incorporating in said organic substance a small amount of di-(2-hydroxylbenzal)-1,2-diaminobenzene.

10. A composition comprising an organic substance containing a small amount of a member of the group consisting of copper and its compounds normally effective to catalyze oxidation of said organic substance and having incorporated therein at least one mol of a copper deactivator for each atom of copper in said organic substance, said copper deactivator having the formula

HO—A—CH=N—R—N=CH—A—OH wherein A represents a member of the group consisting of aromatic rings and unsaturated heterocyclic rings of 5 to 6 atoms in which the hetero atom is nitrogen, the OH radical being attached directly to a ring carbon atom ortho to the —CH=N— group, and R represents a group of the class consisting of aromatic groups, cycloaliphatic groups containing 6 carbon atoms in the ring, and heterocyclic groups containing heterocyclic rings of 6 atoms the hetero atom being nitrogen, and in which the two N atoms are attached directly to adjacent ring carbon atoms or to the most closely positioned ring carbon atoms of different rings other than carbon atoms forming part of the linkage between the two rings of the R group.

11. A composition comprising an orangic substance containing a small amount of a member of the group consisting of copper and its compounds normally effective to catalyze oxidation of said organic substance and having incorporated therein at least one mol of a copper deactivator for each atom of copper in said organic substance, said copper deactivator having the formula

HO—A—CH=N—R—N=CH—A—OH wherein A represents an aromatic group of the benzene series, the OH radical being attached directly to a ring carbon atom ortho to the —CH=N— group, and R represents an aromatic hydrocarbon group, and in which the two N atoms are attached directly to adjacent ring carbon atoms of the R group.

12. A composition comprising an organic substance containing a small amount of a member of the group consisting of copper and its compounds normally effective to catalyze oxidation of said organic substance and having incorporated therein at least one mol of a copper deactivator for each atom of copper in said organic substance, said copper deactivator having the formula

HO—A—CH=N—R—N=CH—A—OH wherein A represents a mononuclear aromatic hydrocarbon group of the benzene series, the OH radical being attached directly to a ring carbon atom ortho to the —CH=N— group, and R represents a mononuclear aromatic hydrocarbon group of the benzene series, and in which the two N atoms are attached directly to adjacent ring carbon atoms of the R group.

13. A composition comprising an organic substance containing a small amount of a member of the group consisting of copper and its compounds normally effective to catalyze oxidation of said organic substance and having incorporated therein at least one mol of di-(2-hydroxylbenzal)-1,2-diaminobenzene for each atom of copper in said organic substance.

14. A composition comprising an organic substance containing a small amount of an antioxidant, normally effective to materially retard deterioration of said organic substance in the absence of copper and its compounds but which is less effective in the presence of copper and its compounds, and containing a small amount of a member of the group consisting of copper and its compounds, normally effective to catalyze oxidation of said organic substance and to materially decrease the effectiveness of said antioxidant, and having incorporated therein at least one mol of a copper deactivator for each atom of copper in said organic substance, said copper deactivator having the formula

HO—A—CH=N—R—N=CH—A—OH wherein A represents a member of the group consisting of aromatic rings and unsaturated heterocyclic rings of 5 to 6 atoms in which the hetero atom is nitrogen, the OH radical being attached directly to a ring carbon atom ortho to the —CH=N— group, and R represents a group of the class consisting of aromatic groups, cycloaliphatic groups containing 6 carbon atoms in the ring, and heterocyclic groups containing heterocyclic rings of 6 atoms the hetero atom being nitrogen, and in which the two N atoms are attached directly to adjacent ring carbon atoms or to the most closely positioned ring carbon atoms of different rings other than carbon atoms forming part of the linkage between the two rings of the R group.

15. A composition comprising an organic substance containing a small amount of an antioxidant, normally effective to materially retard deterioration of said organic substance in the absence of copper and its compounds but which is less effective in the presence of copper and its compounds, and containing a small amount of a member of the group consisting of copper and its compounds, normally effective to catalyze oxidation of said organic substance and to materially decrease the effectiveness of said antioxidant, and having incorporated therein at least one mol of a copper deactivator for each atom of copper in said organic substance, said copper deactivator having the formula

HO—A—CH=N—R—N=CH—A—OH wherein A represents an aromatic group of the benzene series, the OH radical being attached directly to a ring carbon atom ortho to the —CH=N— group, and R represents an aromatic group, and in which the two N atoms are attached directly to adjacent ring carbon atoms of the R group.

16. A composition comprising an organic substance containing a small amount of an antioxidant, normally effective to materially retard deterioration of said organic substance in the absence of copper and its compounds but which is less effective in the presence of copper and its compounds, and containing a small amount of a member of the group consisting of copper and its compounds, normally effective to catalyze oxidation of said organic substance and to materially decrease the effectiveness of said antioxidant, and having incorporated therein at least one mol of di-(2-hydroxylbenzal)-1,2-diaminobenzene for each atom of copper in said organic substance.

FREDERICK B. DOWNING.
CHARLES J. PEDERSEN.